United States Patent
Vastholil et al.

(10) Patent No.: US 11,228,495 B2
(45) Date of Patent: Jan. 18, 2022

(54) BUNDLING OF WIRED AND WIRELESS INTERFACES IN A REDUNDANT INTERFACE OF A HIGH-AVAILABILITY CLUSTER

(71) Applicant: Juniper Networks, Inc., Sunnyvale, CA (US)

(72) Inventors: Ashok Babu Vastholil, Bangalore (IN); Unni Dilip, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 91 days.

(21) Appl. No.: 16/696,283

(22) Filed: Nov. 26, 2019

(65) Prior Publication Data

US 2021/0160140 A1 May 27, 2021

(51) Int. Cl.
*H04W 56/00* (2009.01)
*H04L 12/24* (2006.01)
*H04L 12/26* (2006.01)
*H04L 12/803* (2013.01)
*H04W 24/04* (2009.01)
*H04W 28/02* (2009.01)

(52) U.S. Cl.
CPC ...... *H04L 41/0893* (2013.01); *H04L 41/0668* (2013.01); *H04L 43/0817* (2013.01); *H04L 47/125* (2013.01); *H04W 24/04* (2013.01); *H04W 28/0205* (2013.01)

(58) Field of Classification Search
CPC ............. H04L 41/0893; H04L 41/0668; H04L 43/0817; H04L 47/125; H04W 24/04; H04W 28/0205

USPC ......................................................... 370/236
See application file for complete search history.

(56) References Cited

U.S. PATENT DOCUMENTS

| 2005/0096086 | A1 | 5/2005 | Singamsetty | |
| 2011/0258433 | A1* | 10/2011 | Pulini | H04L 63/20 713/153 |
| 2018/0302321 | A1* | 10/2018 | Manthiramoorthy | H04L 49/1569 |

OTHER PUBLICATIONS

Extended European Search Report for Application No. EP20182027.1, dated Nov. 16, 2020, 9 pages.

* cited by examiner

*Primary Examiner* — Sai Ming Chan
(74) *Attorney, Agent, or Firm* — Harrity & Harrity, LLP (57) ABSTRACT

A system may include a first node in a high-availability cluster; a second node in the high-availability cluster; a redundant interface between a network device and both the first node and the second node, wherein the redundant interface is associated with a redundancy group that designates one of the first node or the second node as a primary node in the high-availability cluster and that designates the other of the first node or the second node as a backup node in the high-availability cluster; a wireless interface of the first node, wherein the wireless interface is included in the redundant interface; and a wired interface of the second node, wherein the wired interface is included in the redundant interface.

20 Claims, 8 Drawing Sheets

BUNDLING OF WIRED AND WIRELESS INTERFACES IN A REDUNDANT INTERFACE OF A HIGH-AVAILABILITY CLUSTER

BACKGROUND

A high-availability cluster may include multiple cluster nodes that are linked or connected together to form a logical or virtual node that is more resilient to faults than if the multiple cluster nodes were to operate in discrete configurations. The multiple cluster nodes in the high-availability cluster may share session information associated with routing sessions and/or user sessions, such that faults in the high-availability cluster may be mitigated by near instantaneous failover and/or reversion of stateful network traffic.

SUMMARY

According to some implementations, a method may include configuring, by one or more nodes in a high-availability cluster, a redundancy group that designates a primary node in the high-availability cluster and a backup node in the high-availability cluster; configuring, by the one or more nodes, a redundant interface for the redundancy group, wherein the redundant interface includes at least: a first interface between a first node in the high-availability cluster and a network device, and a second interface between a second node in the high-availability cluster and the network device, wherein the primary node is one of the first node or the second node and the backup node is the other one of the first node or the second node; configuring, by the first node, a wired interface of the first node as the first interface between the first node and the network device; and configuring, by the second node, a wireless interface of the second node as the second interface between the second node and the network device.

According to some implementations, a first node in a high-availability cluster may include one or more processors to: configure a redundancy group that designates a primary node in the high-availability cluster and a backup node in the high-availability cluster; configure a redundant interface for the redundancy group, wherein the redundant interface includes: a wireless interface between the first node and a network device, and a wired interface between a second node in the high-availability cluster and the network device; configure the wireless interface of the first node to be included in the redundant interface; and communicate with the network device using the wireless interface based on one of: the first node being configured as the primary node, or the first node being configured as the backup node and a determination that the second node has failed.

According to some implementations, a system may include a first node in a high-availability cluster; a second node in the high-availability cluster; a redundant interface between a network device and both the first node and the second node, wherein the redundant interface is associated with a redundancy group that designates one of the first node or the second node as a primary node in the high-availability cluster and that designates the other of the first node or the second node as a backup node in the high-availability cluster; a wireless interface of the first node, wherein the wireless interface is included in the redundant interface; and a wired interface of the second node, wherein the wired interface is included in the redundant interface.

DETAILED DESCRIPTION

The following detailed description of example implementations refers to the accompanying drawings. The same reference numbers in different drawings may identify the same or similar elements.

To form a high-availability cluster, multiple cluster nodes (e.g., two cluster nodes) may be linked and/or connected via multiple interfaces. A control interface between cluster nodes may provide a control link by which cluster nodes may exchange control traffic in order to synchronize routing engine sessions of the cluster nodes. A fabric interface between cluster nodes may provide a fabric link by which cluster nodes may forward network traffic (e.g., traffic that is originated from and/or destined for network devices and/or client devices that are communicatively connected with the high-availability cluster).

The cluster nodes in the high-availability cluster may communicate with a network device, such as a network switch, an access point, and/or the like. For example, the cluster nodes may communicate with the network device via a redundant interface that includes at least one interface from each cluster node. The redundant interface may be mapped to a redundancy group that designates one of the cluster nodes as a primary node and one or more of the cluster nodes as a backup node, and that controls failover in the case of a failure of the primary node. The redundant interface is sometimes referred to as a redundant Ethernet interface because the interfaces included in the redundant interface are all wired interfaces (e.g., Ethernet interfaces) of the cluster nodes in the high-availability cluster. Using all wired interfaces may provide higher reliability and/or higher throughput for data transfer. However, using wired interfaces requires physical network cables, such as Ethernet cables, fiber cables, and/or the like. While physical network cables may provide high transfer rates and reliability, physical network cables increase the cost and complexity of deploying high-availability clusters, decrease the flexibility in deploying high-availability clusters (e.g., the physical network cables may limit the physical placement of cluster nodes in an office building), and/or the like. Furthermore, a cluster node may be subject to physical limitations on the number of physical network cables that can be connected to the cluster node. This may limit throughput if all available physical ports of the cluster node are in use.

Some implementations described herein enable a redundant interface of a high-availability cluster to include both a wired interface and a wireless interface. In this way, one or more cluster nodes in the high-availability cluster may be wirelessly connected to a network device, which decreases the cost and complexity of deploying the high-availability cluster. Moreover, the flexibility of deploying the high-availability cluster is increased in that the physical locations of the cluster nodes is not restricted due to physical network cable requirements. Accordingly, the cluster nodes may be more optimally placed (e.g., in an office building, across a campus, and/or the like) such that the wireless coverage of the high-availability cluster, for client devices and/or network devices that communicatively connect with the high-availability cluster, may be increased. Furthermore, throughput may be increased for a cluster node by adding an additional interface (e.g., a wireless interface) where the cluster node would otherwise not be able to increase throughput due to limitations on physical ports, such as if all physical ports of the cluster node are in use and an additional wired interface cannot be added.

Figure 1A:
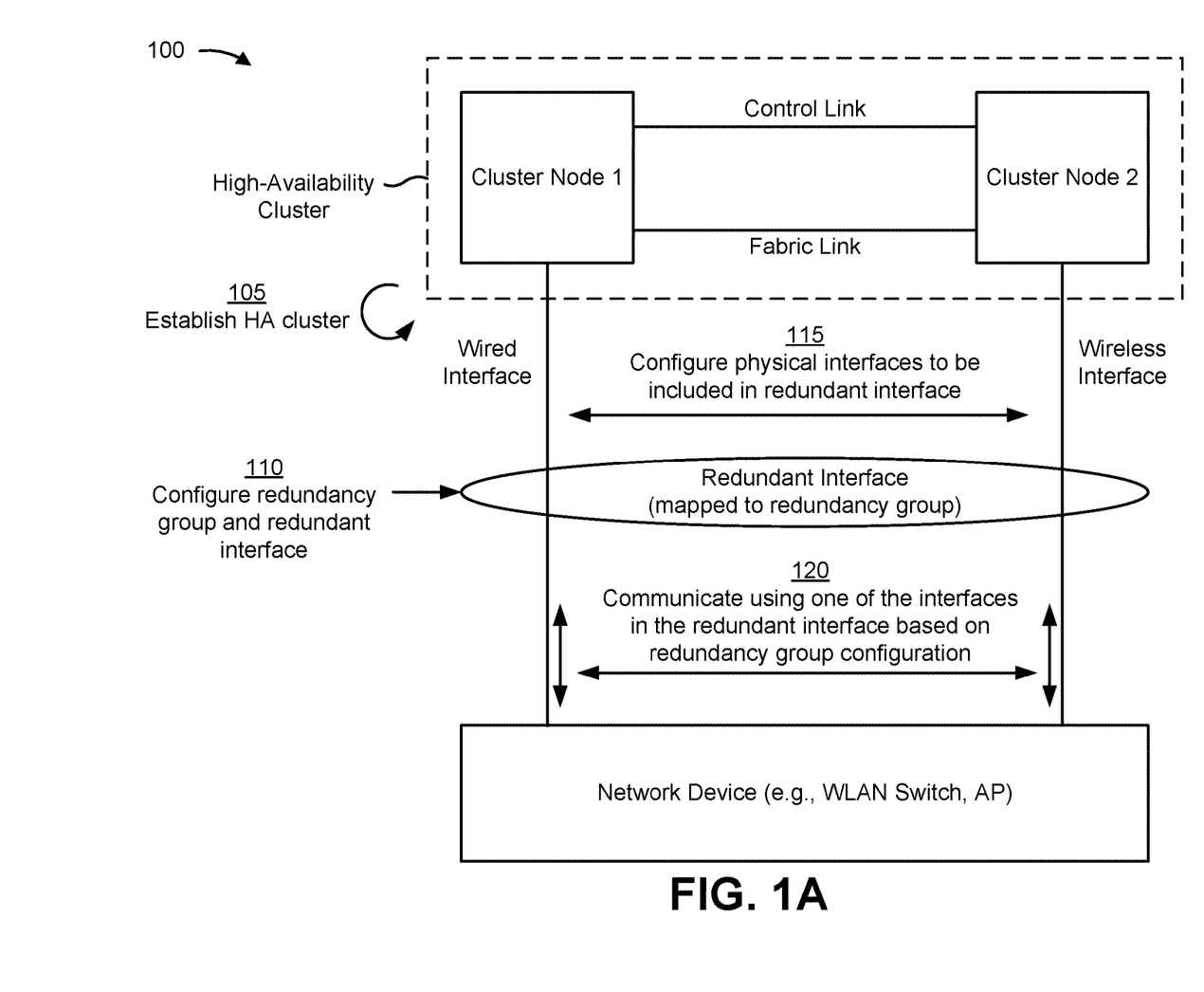
FIGS. 1A-1C are diagrams of one or more example implementations described herein.
Figure 1B:
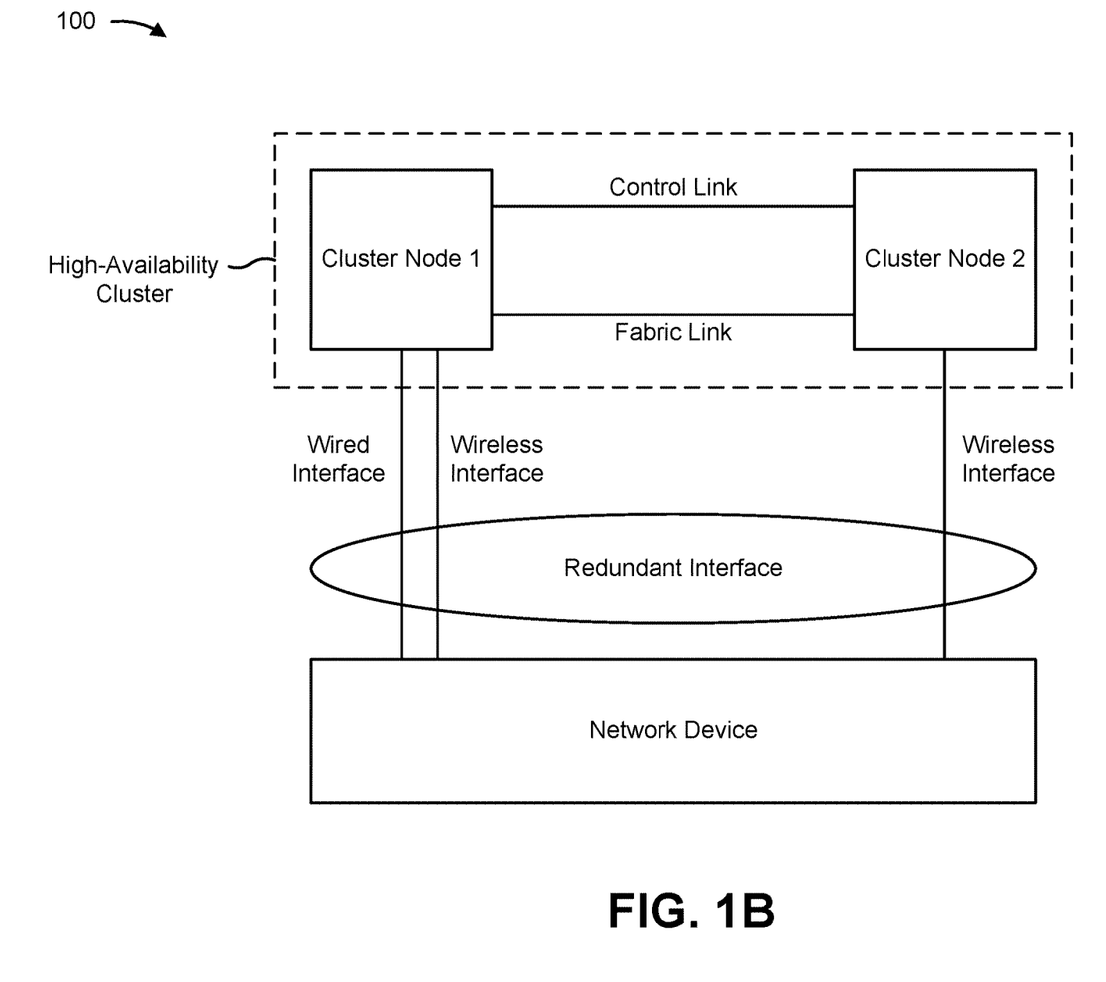
Figure 1C:
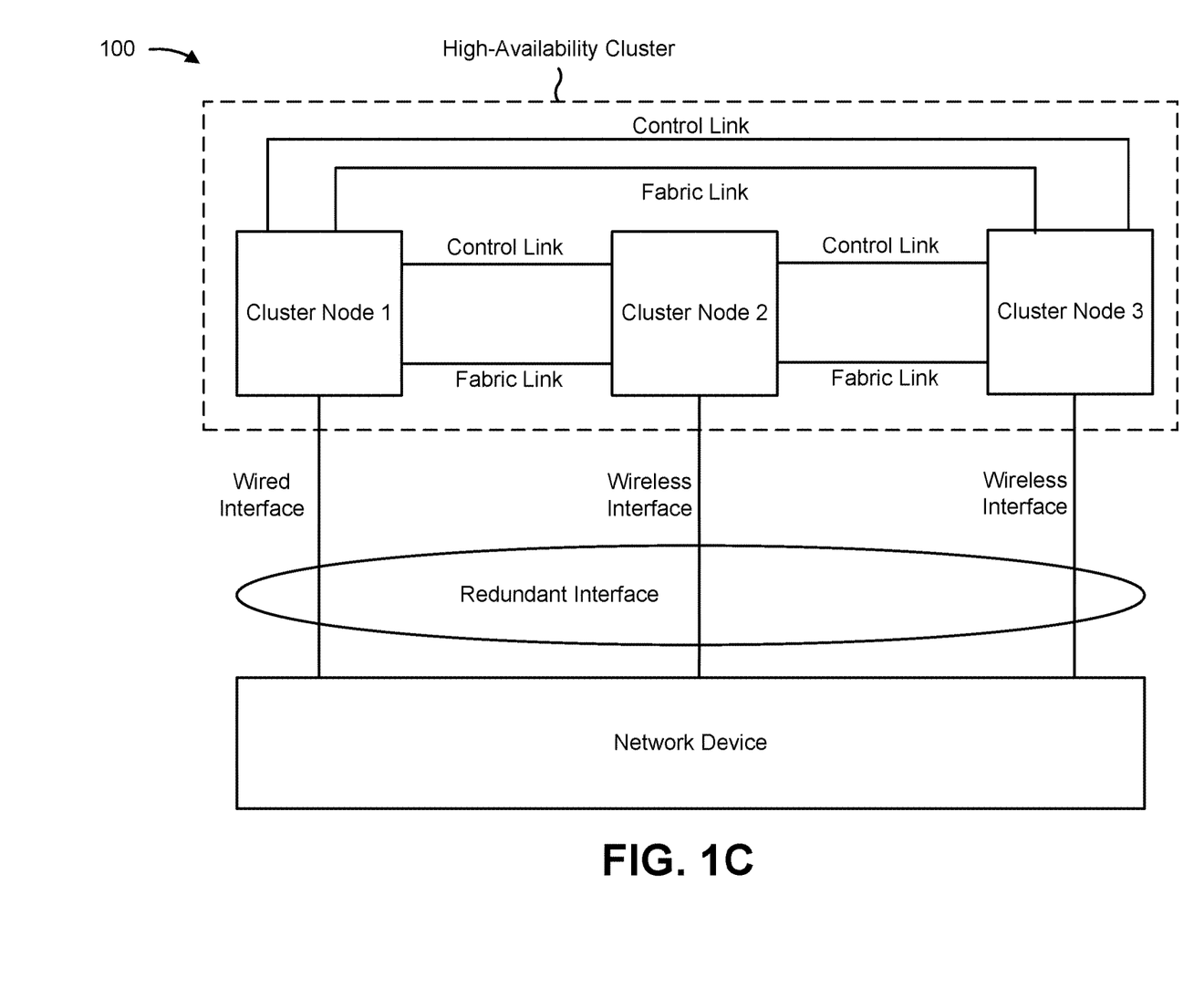

FIGS. 1A-1C are diagrams of one or more example implementations 100 described herein. As shown in FIGS. 1A-1C, example implementation(s) 100 may include multiple cluster nodes (e.g., two cluster nodes) in a high-availability cluster, such as cluster node 1, cluster node 2, and/or the like. The cluster nodes in the high-availability cluster may communicate with a network device (e.g., a network switch, a wireless local area network (WLAN) switch, an access point, and/or the like) via a redundant interface that connects multiple cluster nodes to the network device. A cluster node may include a router, a switch, or a gateway, among other examples. In some implementations, example implementation(s) 100 may include a greater quantity of cluster nodes, a greater quantity of network devices, and/or a greater quantity of high-availability clusters.

In some implementations, the cluster nodes may be linked and/or connected together to form a high-availability cluster. In this case, the cluster nodes may be linked and/or connected together to form a logical or virtual node (which may be referred to as a chassis cluster) that is more resilient to faults than if the cluster nodes were to operate in discrete configurations. The cluster nodes in the high-availability cluster may share session information associated with routing engine sessions and/or user sessions such that faults in the high-availability cluster may be mitigated by near instantaneous failover and/or reversion of stateful network traffic. The high-availability cluster may be deployed in various settings, contexts, and/or locations, such as an office branch, a campus, a retail location, and/or the like.

As shown in FIG. 1A, cluster node 1 and cluster node 2 (as well as other cluster nodes in the high-availability cluster) may be linked and/or connected via multiple links, such as a control link, a fabric link, and/or the like. Cluster node 1 and cluster node 2 may exchange control traffic (e.g., traffic that is originated and/or terminated in a control plane or routing engine) via the control link, and may forward network traffic (e.g., traffic that is to be forwarded by a data plane or forwarding engine of a cluster node) via the fabric link.

Cluster node 1 and cluster node 2 may exchange control traffic via the control link to form a unified control plane or routing engine for the high-availability cluster, to synchronize the configuration and kernel state of the control plane or routing engine to facilitate the high-availability of interfaces and services of the high-availability cluster, and/or the like. The control traffic may include, for example, routing engine session information, information identifying one or more routing tables (e.g., a routing information base (RIB), a forwarding information base (FIB), a label information base (LIB), a label forwarding instance base (LFIB), and/or the like) associated with the routing engine, routing protocol traffic (e.g., border gateway protocol (BGP) traffic, open shortest path first (OSPF) traffic, routing information protocol (RIP) traffic, intermediate system to intermediate system (IS-IS) protocol traffic, and/or the like), keep-alive or heartbeat packets (e.g., packets that may be used to determine whether a cluster node has become unresponsive and/or whether a failure or fault associated with a cluster node has occurred), and/or the like. The control link may be a wired control link or a wireless control link.

The fabric link may permit cluster node 1 and cluster node 2 (and other cluster nodes in the high-availability cluster) to form a unified data plane or forwarding engine for the high-availability cluster. In this case, cluster node 1 and cluster node 2 may forward network traffic via the fabric link (e.g., cluster node 1 may forward network traffic to cluster node 2 via the fabric link and/or cluster node 2 may forward network traffic to cluster node 1 via the fabric link). The network traffic (which also may be referred to as transit traffic) may include application traffic, web traffic, voice (e.g., voice over Internet protocol (VoIP)) traffic, and/or other types of traffic that originated and/or terminated at a client device and/or other devices that communicatively connect with the high-availability cluster. The fabric link may be a wired fabric link or a wireless fabric link.

As shown by reference number 105, cluster node 1 and cluster node 2 (and other cluster nodes) may perform a process to form and/or establish the high-availability cluster, to add and/or remove cluster nodes from the high-availability cluster, and/or the like. For example, each cluster node may configure a cluster identifier and a node identifier. The cluster identifier may be associated with the high-availability cluster and may distinguish the high-availability cluster from other high-availability clusters. In this case, cluster node 1 and cluster node 2 may be configured with the same cluster identifier such that cluster node 1 and cluster node 2 are to be included in the same high-availability cluster. The cluster identifier may include a name, a numeric value, an alpha-numeric string, and/or the like.

The node identifier may be associated with and specific to a cluster node such that the node identifier may distinguish the cluster node from other cluster nodes in the same high-availability cluster. In this case, cluster node 1 and cluster node 2 may be configured with different node identifiers. The node identifier may include a name, a numeric value, an alpha-numeric string, and/or the like.

In some implementations, a cluster node (e.g., cluster node 1, cluster node 2, and/or the like) may configure a cluster identifier and node identifier for the cluster node based on receiving an instruction (e.g., a chassis cluster command and/or another type of instruction), which may be provided as input to the cluster node (e.g., by a user via a console port, a command line interface, and/or another means for input to the cluster node). In some implementations, a cluster node may automatically configure a cluster identifier and node identifier for the cluster node based on an event, such as a reboot or restart of the cluster node and/or the like.

As shown by reference number 110, cluster node 1 and cluster node 2 may configure a redundancy group for the high-availability cluster. Additionally, or alternatively, cluster node 1 and cluster node 2 may configure a redundant interface between the high-availability cluster and the network device. The redundant interface may be associated with and/or may map to the redundancy group. In some implementations, cluster node 1 and cluster node 2 may configure the redundancy group and/or the redundant interface based on receiving an instruction, which may be provided as input (e.g., by a user via a console port, a command line interface, and/or another means for input).

A redundancy group or a configuration of the redundancy group (e.g., a redundancy group configuration) may designate a primary node in the high-availability cluster and a backup node in the high-availability cluster. For example, a redundancy group configuration may designate cluster node 1 as the primary node and cluster node 2 as the backup node. Alternatively, a redundancy group configuration may designate cluster node 2 as the primary node and cluster node 1 as the backup node. A redundancy group includes and manages a collection of objects on both cluster nodes of a high-availability cluster, and manages failover between cluster nodes.

Initially, the primary node may be an active node and the backup node may be an inactive node. An active node may exchange traffic between the high-availability cluster and the network device, and an inactive node may not exchange traffic between the high-availability cluster and the network device by default. At any time, only a single cluster node may be active, and all other cluster nodes are inactive. A redundancy group of an active node includes objects in an active state, while the same redundancy group of an inactive node includes the same objects in an inactive state. When the active node fails, the redundancy group activates the objects on the inactive node in a failover procedure (for example) and deactivates those objects on the active node. In this case, the active node becomes an inactive node and the inactive node becomes the active node. In some implementations, designation of a cluster node as a primary node or a backup node may be fixed according to a configuration (and may only change due to user input of a new configuration), while designation of a cluster node as an active node or an inactive node may change dynamically due to node failure.

A redundant interface includes at least a first interface, between a first node in the high-availability cluster (e.g., cluster node 1) and a network device, and a second interface between a second node in the high-availability cluster (e.g., cluster node 2) and the network device. More generally, a redundant interface may include a minimum of one physical interface (e.g., a wired interface or a wireless interface) from each cluster node in the high-availability cluster. The redundant interface may be a pseudo-interface that includes a physical interface from each cluster node in the high-availability cluster (e.g., that interfaces each cluster node to the network device). The redundant interface of an active node is responsible for transferring traffic to and from the high-availability cluster (e.g., between the high-availability cluster and the network device). In some implementations, there may be a one-to-one correspondence between redundancy groups and redundant interfaces.

As shown by reference number 115, cluster node 1 and cluster node 2 may configure the physical interfaces to be included in the redundant interface. For example, cluster node 1 may configure one or more physical interfaces (e.g., wired or wireless interfaces of cluster node 1) to be included in the redundant interface. Similarly, cluster node 2 may configure one or more physical interfaces (e.g., wired or wireless interfaces of cluster node 2) to be included in the redundant interface. In some implementations, cluster node 1 and cluster node 2 may configure the physical interfaces to be included in the redundant interface based on receiving an instruction, which may be provided as input (e.g., by a user via a console port, a command line interface, and/or another means for input).

As shown, at least one of the physical interfaces included in the redundant interface may be a wireless interface. A wireless interface may use a wireless channel to communicate. A wireless channel may include a particular channel frequency, an upper frequency bound, and/or a lower frequency bound determined based on a channel width (e.g., 20 MHz, 40 MHz, and/or the like). For example, a wireless channel may have a channel frequency of 2.412 GHz and a channel width of 20 MHz, and therefore may have an upper frequency bound of 2.422 GHz and a lower frequency bound of 2.402 GHz. In some implementations, a channel frequency may be associated with various licensed and/or unlicensed radio frequency (RF) ranges, such as the 2.4 GHz RF range (e.g., between 2.4 GHz and 2.5 GHz), the 5 GHz RF range (e.g., between 4.9 GHz and 6 GHz), the 60 GHz RF range (e.g., between 57 GHz and 64 GHz), and/or the like. The wireless interface may include a wireless local area network (WLAN) interface (e.g., a Wi-Fi interface), a wireless personal area network (WPAN) interface (e.g., a Bluetooth interface), and/or the like. In some implementations, a channel frequency may be unassociated with an RF range and/or with any defined communication protocol channel. A wired interface may include an Ethernet interface, among other examples.

In the example of FIG. 1A, cluster node 1 configures a wired interface to be included in the redundant interface, and cluster node 2 configures a wireless interface to be included in the redundant interface. In some implementations, a wired or wireless interface may be mapped to (e.g., included in) the redundant interface based on receiving input that includes a physical interface identifier and a redundant interface identifier. The cluster node may configure a physical interface, identified by the physical interface identifier, to be included in a redundant interface identified by the redundant interface identifier.

As shown by reference number 120, the high-availability cluster may communicate with the network device (e.g., to transmit and/or receive data) using one of the physical interfaces included in the redundant interface. In some implementations, the physical interface used for communication may depend on the redundancy group configuration and/or a redundant interface configuration. For example, if cluster node 1 is configured as the primary node and has not failed, then the wired interface of cluster node 1 may be used to communicate with the network device. In this case, the wired interface of cluster node 1 may be an active interface (while cluster node 1 is the active node), and the wireless interface of cluster node 2 may be an inactive interface (while cluster node 2 is the inactive node). If cluster node 1 (e.g., the primary node) fails, then the wireless interface of cluster node 2 (e.g., the backup node) becomes the active interface for communication with the network device (and cluster node 2 becomes the active node), and the wired interface of cluster node 1 becomes an inactive interface (and cluster node 1 becomes the inactive node). In some implementations, a physical interface included in the redundant interface may be activated or deactivated based on a redundancy group configuration, a designation of a cluster node as a primary node or a secondary node, detection of a failure of a cluster node, a determination of an active node, and/or the like.

As shown in FIG. 1B, in some implementations, the redundant interface may include multiple physical interfaces from the same cluster node. In the example of FIG. 1B, the redundant interface includes a wired interface of cluster node 1, a wireless interface of cluster node 1, and a wireless interface of cluster node 2. In this example, cluster node 1 may configure multiple interfaces of cluster node 1 (e.g., the wired interface and the wireless interface) to be included in the redundant interface, in a similar manner as described above. In this case, the throughput of traffic transfer between cluster node 1 and the network device can be increased by using multiple interfaces of cluster node 1. In some implementations, all of the wired interfaces of cluster node 1 may be used, occupied, or assigned (e.g., cluster node 1 may not have any available or unused wired interfaces). By bundling or including the wireless interface and the wired interface of cluster node 1 in the redundant interface, throughput may be increased despite cluster node 1 not having any wired interfaces available.

In some implementations, cluster node 1 or the network device may perform load balancing across the multiple interfaces of cluster node 1 that are included in the redundant interface. For example, cluster node 1 may configure load balancing across the interfaces, such as by configuring a weight or a priority to be applied to the interfaces. In some implementations, cluster node 1 may configure load balancing for the interfaces based on receiving an instruction, which may be provided as input to the cluster node (e.g., by a user via a console port, a command line interface, and/or another means for input to the cluster node). For example, the instruction may indicate a set of weights or priorities to be applied across the interfaces. In some implementations, cluster node 1 may automatically configure load balancing (e.g., without user input), such as by assigning a higher weight or a higher priority to the wired interface as compared to the wireless interface, thereby resulting in more load on the wired interface as compared to the wireless interface. This may improve reliability, reduce latency, increase throughput, reduce wireless interference, and/or the like.

Although FIG. 1B shows cluster node 1 as having two physical interfaces (a wired interface and a wireless interface) included in the redundant interface and cluster node 2 as having one physical interface (a wireless interface) included in the redundant interface, other configurations are contemplated. For example, a cluster node may include a different number of physical interfaces included in the redundant interface (e.g., three physical interfaces, four physical interfaces, and/or the like) and/or different combinations of physical interface types (e.g., wired or wireless) included in the redundant interface, among other examples.

As shown in FIG. 1C, in some implementations, the high-availability cluster may include more than two cluster nodes (shown as three cluster nodes, including cluster node 1, cluster node 2, and cluster node 3). In this case, the redundant interface may include physical interfaces from more than two cluster nodes. For example, the redundant interface may include at least one physical interface from each cluster node included in the high-availability cluster. In the example of FIG. 1C, the redundant interface includes a wired interface of cluster node 1, a wireless interface of cluster node 2, and a wireless interface of cluster node 3. In this example, cluster node 3 may configure the wireless interface of cluster node 3 to be included in the redundant interface, in a similar manner as described above. Although FIG. 1C shows three cluster nodes in the high-availability cluster, a different number of cluster nodes may be included in the high-availability cluster.

As indicated above, FIGS. 1A-1C are provided merely as one or more examples. Other examples may differ from what is described with regard to FIGS. 1A-1C.

Figure 2:
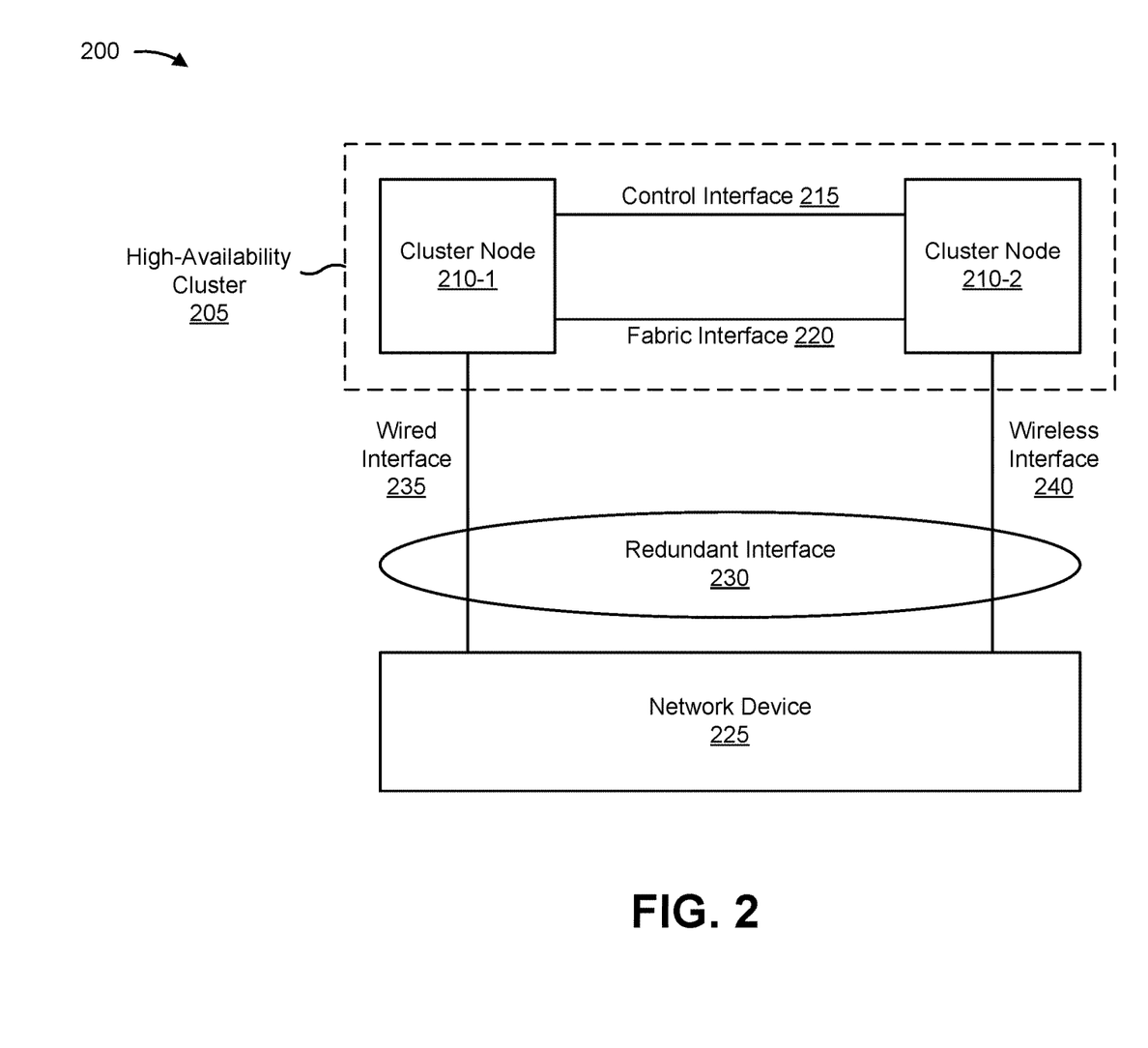
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a high-availability cluster 205, a set of cluster nodes 210 (shown as a first cluster node 210-1 and a second cluster node 210-2) in the high-availability cluster 205, a control interface 215 between cluster nodes 210, a fabric interface 220 between cluster nodes 210, a network device 225, a redundant interface 230, a wired interface 235, and a wireless interface 240. Devices of environment 200 may interconnect via wired connections, wireless connections, or a combination of wired and wireless connections, as described herein.

As described above in connection with FIGS. 1A-1C, multiple cluster nodes 210 (e.g., two cluster nodes 210) may be linked, connected, and/or configured to form the high-availability cluster 205. For example, the cluster nodes 210 may form a logical or virtual node (which may be referred to as a chassis cluster) that is more resilient to faults than if the cluster nodes 210 were to operate in discrete configurations. The cluster nodes 210 in the high-availability cluster 205 may share session information associated with routing engine sessions and/or user sessions such that faults in the high-availability cluster 205 may be mitigated by near instantaneous failover and/or reversion of stateful network traffic. A cluster node 210 may include a gateway (e.g., a network gateway), a router, a hub, a switch, a firewall, a bridge, or a similar type of device. In some implementations, the cluster node 210 may be a physical device implemented within a housing, such as a chassis. In some implementations, the cluster node 210 may be a virtual device implemented by one or more computer devices of a cloud computing environment or a data center.

Cluster nodes 210 may communicate with one another via the control interface 215 to exchange control information, and/or may communicate with one another via the fabric interface 220 to exchange data, as described in more detail above in connection with FIGS. 1A-1C. The control interface 215 may be a wired interface or a wireless interface. Similarly, the fabric interface 220 may be a wired interface or a wireless interface.

The cluster nodes 210 may communicate with the network device 225 via a redundant interface 230, as described above in connection with FIGS. 1A-1C. The network device may include a network switch, a local area network (LAN) switch, a WLAN switch, an access point, or a base station (e.g., eNodeB, NodeB, gNodeB, and/or the like), among other examples. In some implementations, the network device 225 may be a physical device implemented within a housing, such as a chassis. In some implementations, the network device 225 may be a virtual device implemented by one or more computer devices of a cloud computing environment or a data center.

The redundant interface 230 may connect multiple cluster nodes 210 to the network device 225. For example, the redundant interface 230 may include at least one interface between each cluster node 210, in the high-availability cluster 205, and the network device 225. In example environment 200, the redundant interface 230 includes at least a wired interface 235 between the first cluster node 210-1 and the network device 225, and a wireless interface 240 between the second cluster node 210-2 and the network device 225. Additional details regarding the redundant interface 230 are described above in connection with FIGS. 1A-1C.

The number and arrangement of devices shown in FIG. 2 are provided as one or more examples. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
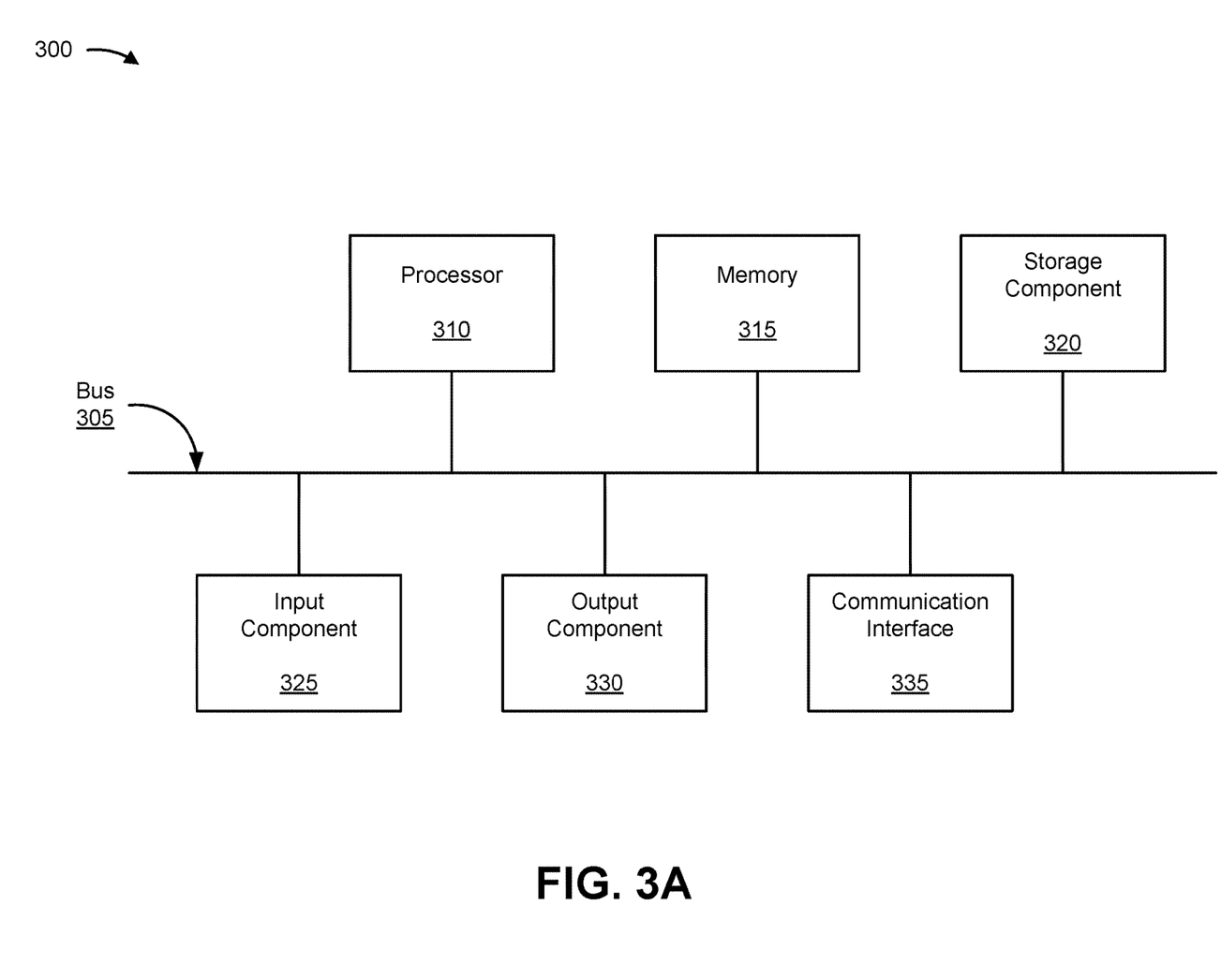
FIGS. 3A and 3B are diagrams of example components of one or more devices of FIG. 2.

FIGS. 3A and 3B are diagrams of example components of one or more devices of FIG. 2. FIG. 3A is a diagram of example components of a device 300. Device 300 may correspond to cluster node 210 and/or network device 225. In some implementations, cluster node 210 and/or network device 225 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
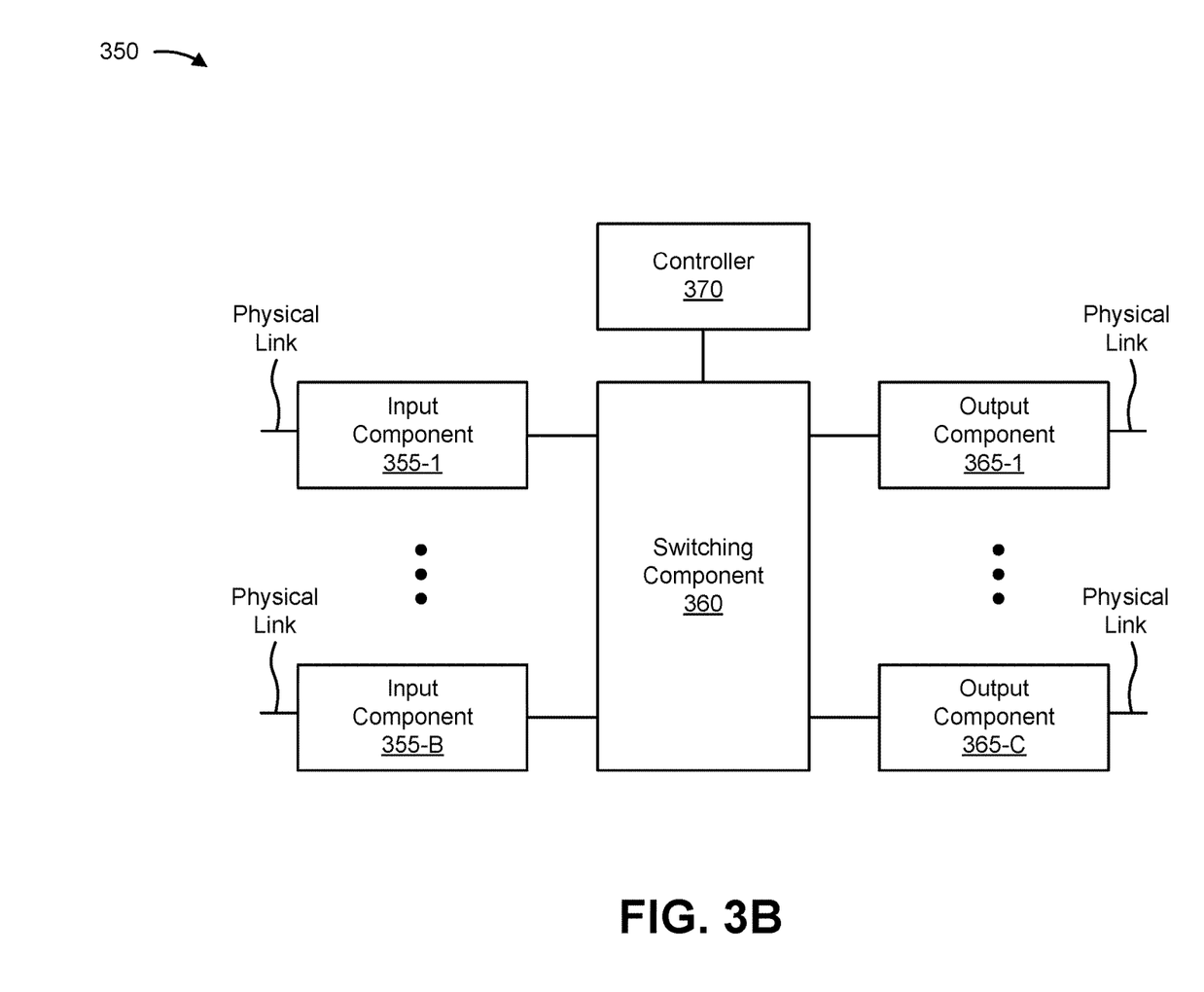

FIG. 3B is a diagram of example components of a device 350. In some implementations, device 350 may correspond to cluster node 210 and/or network device 225. In some implementations, cluster node 210 and/or network device 225 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input components 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
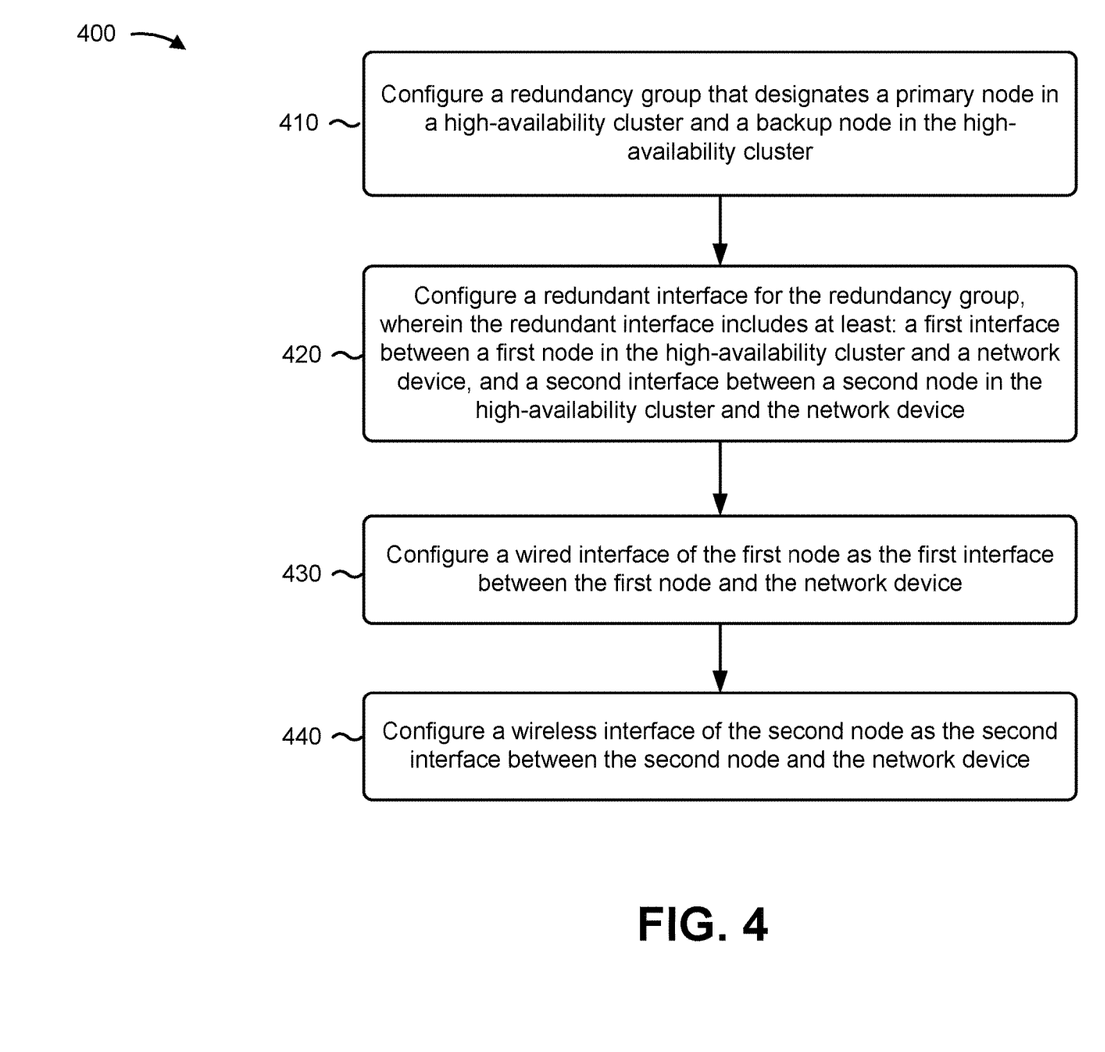
FIGS. 4 and 5 are flow charts of example processes for bundling of wired and wireless interfaces in a redundant interface of a high-availability cluster.

FIG. 4 is a flow chart of an example process 400 for bundling of wired and wireless interfaces in a redundant interface of a high-availability cluster. In some implementations, one or more process blocks of FIG. 4 may be performed by one or more cluster nodes (e.g., one or more cluster nodes 210). In some implementations, one or more process blocks of FIG. 4 may be performed by another device or a group of devices separate from or including the one or more cluster nodes, such as a network device (e.g., network device 225).

As shown in FIG. 4, process 400 may include configuring a redundancy group that designates a primary node in a high-availability cluster and a backup node in the high-availability cluster (block 410). For example, a cluster node (e.g., using processor 310, memory 315, input component 325, communication interface 335, controller 370, and/or the like) may configure a redundancy group that designates a primary node in the high-availability cluster and a backup node in the high-availability cluster, as described above.

As further shown in FIG. 4, process 400 may include configuring a redundant interface for the redundancy group, wherein the redundant interface includes at least: a first interface between a first node in the high-availability cluster and a network device, and a second interface between a second node in the high-availability cluster and the network device (block 420). For example, a cluster node (e.g., using processor 310, memory 315, input component 325, communication interface 335, controller 370, and/or the like) may configure a redundant interface for the redundancy group, as described above. In some implementations, the redundant interface includes at least a first interface between a first node in the high-availability cluster and a network device, and a second interface between a second node in the high-availability cluster and the network device. In some implementations, the primary node is one of the first node or the second node and the backup node is the other one of the first node or the second node.

As further shown in FIG. 4, process 400 may include configuring a wired interface of the first node as the first interface between the first node and the network device (block 430). For example, a cluster node (e.g., using processor 310, memory 315, input component 325, communication interface 335, controller 370, and/or the like) may configure a wired interface of the first node as the first interface between the first node and the network device, as described above.

As further shown in FIG. 4, process 400 may include configuring a wireless interface of the second node as the second interface between the second node and the network device (block 440). For example, a cluster node (e.g., using processor 310, memory 315, input component 325, communication interface 335, controller 370, and/or the like) may configure a wireless interface of the second node as the second interface between the second node and the network device, as described above.

Process 400 may include additional implementations, such as any single implementation or any combination of implementations described below and/or in connection with one or more other processes described elsewhere herein.

In a first implementation, process 400 includes communicating with the network device using one of the wired interface or the wireless interface based on whether the first node or the second node is configured as the primary node.

In a second implementation, alone or in combination with the first implementation, process 400 includes detecting failure of the primary node, and communicating with the network device using the other of the wired interface or the wireless interface based on detecting the failure of the primary node.

In a third implementation, alone or in combination with one or more of the first and second implementations, process 400 includes configuring a wireless interface of the first node as a third interface between the first node and the network device, wherein the redundant interface includes the third interface.

In a fourth implementation, alone or in combination with one or more of the first through third implementations, process 400 includes performing load balancing between the first interface and the third interface based on a load balancing configuration of the first node.

In a fifth implementation, alone or in combination with one or more of the first through fourth implementations, at least one of the redundancy group, the redundant interface, the wired interface, or the wireless interface is configured based on input received via a command line interface.

In a sixth implementation, alone or in combination with one or more of the first through fifth implementations, the network device is an access point or a wireless local area network switch.

In a seventh implementation, alone or in combination with one or more of the first through sixth implementations, process 400 includes configuring one of a wireless interface of a third node in the high-availability cluster or a wired interface of the third node as a third interface between the third node and the network device, wherein the redundant interface is including the third interface.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
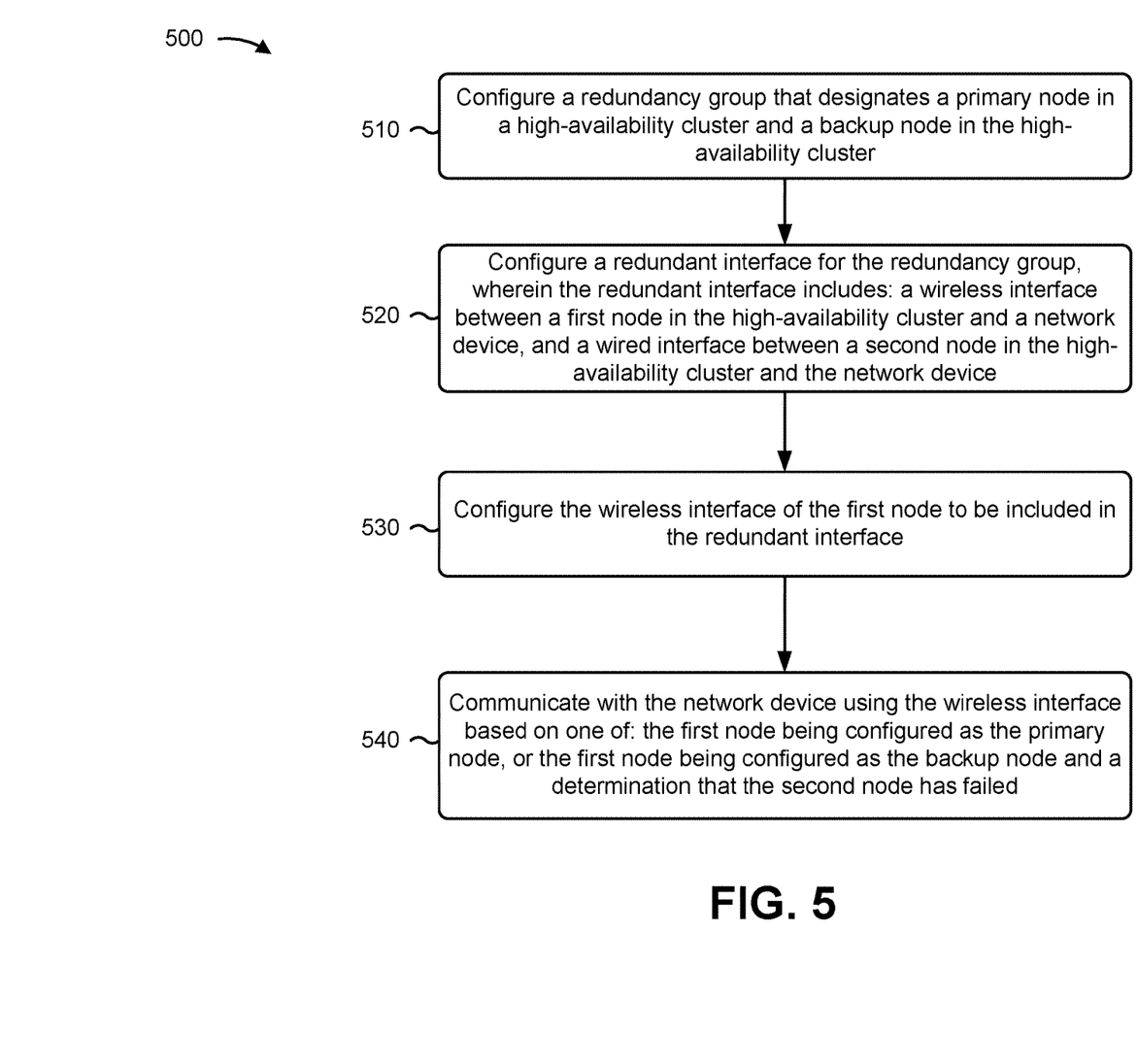

FIG. 5 is a flow chart of an example process 500 for bundling of wired and wireless interfaces in a redundant interface of a high-availability cluster. In some implementations, one or more process blocks of FIG. 5 may be performed by a cluster node (e.g., cluster node 210). In some implementations, one or more process blocks of FIG. 5 may be performed by another device or a group of devices separate from or including the cluster node, such as a network device (e.g., network device 225).

As shown in FIG. 5, process 500 may include configuring a redundancy group that designates a primary node in the high-availability cluster and a backup node in the high-availability cluster (block 510). For example, the cluster node (e.g., using processor 310, memory 315, input component 325, communication interface 335, controller 370, and/or the like) may configure a redundancy group that designates a primary node in the high-availability cluster and a backup node in the high-availability cluster, as described above.

As further shown in FIG. 5, process 500 may include configuring a redundant interface for the redundancy group, wherein the redundant interface includes: a wireless interface between a first node in the high-availability cluster and a network device, and a wired interface between a second node in the high-availability cluster and the network device (block 520). For example, the cluster node (e.g., using processor 310, memory 315, input component 325, communication interface 335, controller 370, and/or the like) may configure a redundant interface for the redundancy group, as described above. In some implementations, the redundant interface includes a wireless interface between a first node in the high-availability cluster and a network device, and a wired interface between a second node in the high-availability cluster and the network device.

As further shown in FIG. 5, process 500 may include configuring the wireless interface of the first node to be included in the redundant interface (block 530). For example, the cluster node (e.g., using processor 310, memory 315, input component 325, communication interface 335, controller 370, and/or the like) may configure the wireless interface of the first node to be included in the redundant interface, as described above.

As further shown in FIG. 5, process 500 may include communicating with the network device using the wireless interface based on one of: the first node being configured as the primary node, or the first node being configured as the backup node and a determination that the second node has failed (block 540). For example, the cluster node (e.g., using processor 310, memory 315, input component 325, communication interface 335, controller 370, and/or the like) may communicate with the network device using the wireless interface based on one of, as described above.

Process 500 may include additional implementations, such as any single implementation or any combination of implementations described below and/or in connection with one or more other processes described elsewhere herein.

In a first implementation, process 500 includes configuring a wired interface between the first node and the network device to be included in the redundant interface.

In a second implementation, alone or in combination with the first implementation, process 500 includes performing load balancing between the wireless interface of the first node and the wired interface of the first node based on a load balancing configuration of the first node.

In a third implementation, alone or in combination with one or more of the first and second implementations, process 500 includes receiving input via a command line interface; and configuring at least one of the redundancy group, the redundant interface, or the wireless interface based on input received via the command line interface.

In a fourth implementation, alone or in combination with one or more of the first through third implementations, the first node is a first network gateway and the second node is a second network gateway, and the first node and the second node communicate via a control link and a fabric link.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   configuring, by one or more nodes in a high-availability cluster, a redundancy group that designates a primary node in the high-availability cluster and a backup node in the high-availability cluster;
   configuring, by the one or more nodes, a redundant interface for the redundancy group, wherein the redundant interface includes at least:
      a first interface between a first node in the high-availability cluster and a network device, and
      a second interface between a second node in the high-availability cluster and the network device,
         wherein the primary node is one of the first node or the second node and the backup node is the other one of the first node or the second node;
   configuring, by the first node, a wired interface of the first node as the first interface between the first node and the network device; and
   configuring, by the second node, a wireless interface of the second node as the second interface between the second node and the network device,
      wherein configuring the wireless interface is based on mapping the wireless interface to the redundant interface using a physical interface identifier and a redundant interface identifier based on receiving input that includes the physical interface identifier and the redundant interface identifier.

2. The method of claim 1, further comprising:
   communicating with the network device using one of the wired interface or the wireless interface based on whether the first node or the second node is configured as the primary node.

3. The method of claim 2, further comprising:
   detecting failure of the primary node; and
   communicating with the network device using the other of the wired interface or the wireless interface based on detecting the failure of the primary node.

4. The method of claim 1, further comprising:
   configuring, by the first node, a wireless interface of the first node as a third interface between the first node and the network device, wherein the redundant interface includes the third interface.

5. The method of claim 4, further comprising:
   performing load balancing between the first interface and the third interface based on a load balancing configuration of the first node.

6. The method of claim 1, wherein at least one of the redundancy group, the redundant interface, the wired interface, or the wireless interface is configured based on input received via a command line interface.

7. The method of claim 1, wherein the network device is an access point or a wireless local area network switch.

8. The method of claim 1, further comprising:
   configuring, by a third node in the high-availability cluster, one of a wireless interface of the third node or a wired interface of the third node as a third interface between the third node and the network device, wherein the redundant interface includes the third interface.

9. A first node in a high-availability cluster, comprising:
   one or more processors to:
      configure a redundancy group that designates a primary node in the high-availability cluster and a backup node in the high-availability cluster;
      configure a redundant interface for the redundancy group, wherein the redundant interface includes:
         a wireless interface between the first node and a network device, and
         a wired interface between a second node in the high-availability cluster and the network device;
      configure the wireless interface of the first node to be included in the redundant interface,
         wherein the one or more processors, when configuring the wireless interface, are to configure the wireless interface based on a mapping of the wireless interface to the redundant interface using a physical interface identifier and a redundant interface identifier based on receiving input that includes the physical interface identifier and the redundant interface identifier; and
      communicate with the network device using the wireless interface based on one of:
         the first node being configured as the primary node, or
         the first node being configured as the backup node and a determination that the second node has failed.

10. The first node of claim 9, wherein the one or more processors are further to:
    configure a wired interface between the first node and the network device to be included in the redundant interface.

11. The first node of claim 10, wherein the one or more processors are further to:
    perform load balancing between the wireless interface of the first node and the wired interface of the first node based on a load balancing configuration of the first node.

12. The first node of claim 9, wherein the one or more processors are further to:
  receiving input via a command line interface; and
  configure at least one of the redundancy group, the redundant interface, or the wireless interface based on input received via the command line interface.

13. The first node of claim 9, wherein the first node is a first network gateway and the second node is a second network gateway, and wherein the first node and the second node communicate via a control link and a fabric link.

14. A system, comprising:
  a first node in a high-availability cluster;
  a second node in the high-availability cluster;
  a redundant interface between a network device and both the first node and the second node,
    wherein the redundant interface is associated with a redundancy group that designates one of the first node or the second node as a primary node in the high-availability cluster and that designates the other of the first node or the second node as a backup node in the high-availability cluster;
  a wireless interface of the first node, wherein the wireless interface is included in the redundant interface,
    wherein the wireless interface is included in the redundant interface based on a mapping of the wireless interface to the redundant interface using a physical interface identifier and a redundant interface identifier based on receiving input that includes the physical interface identifier and the redundant interface identifier; and
  a wired interface of the second node, wherein the wired interface is included in the redundant interface.

15. The system of claim 14, wherein the system is to route communications between the first node and the network device via the wireless interface based on one of:
  the first node being configured as the primary node, or
  the first node being configured as the backup node and a determination that the second node has failed.

16. The system of claim 14, wherein the system is to route communications between the second node and the network device via the wired interface based on one of:
  the second node being configured as the primary node, or
  the second node being configured as the backup node and a determination that the first node has failed.

17. The system of claim 14, wherein traffic is routed through one of the wired interface or the wireless interface of the redundant interface based on a configuration of the redundant interface and a configuration of the redundancy group.

18. The system of claim 14, further comprising at least one of:
  a wired interface of the first node, wherein the wired interface of the first node is included in the redundant interface, or
  a wireless interface of the second node, wherein the wireless interface of the second node is included in the redundant interface.

19. The system of claim 14, further comprising:
  a control link between the first node and the second node for carrying control packets; and
  a fabric link between the first node and the second node for carrying data packets.

20. The system of claim 14, further comprising:
  a third node in the high-availability cluster; and
  at least one of a wireless interface of the third node or a wired interface of the third node, wherein the at least one of the wireless interface of the third node or the wired interface of the third node is included in the redundant interface.

* * * * *